Figure 1:
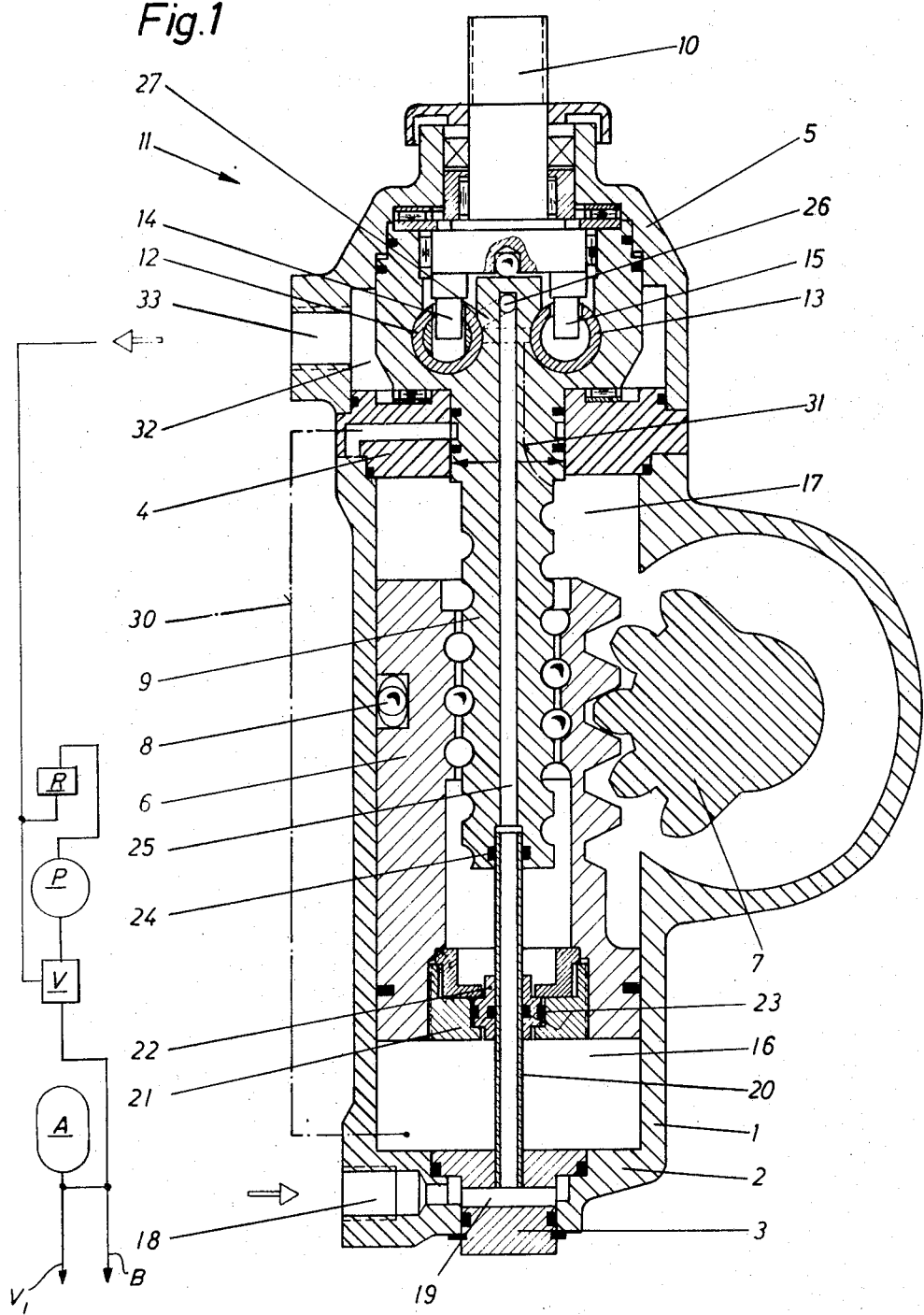

United States Patent [19]

Jablonsky

[11] 3,832,933

[45] Sept. 3, 1974

[54] AUXILIARY POWER STEERING DEVICE FOR VEHICLES WITH PRESSURE ACCUMULATORS

[75] Inventor: Erich Jablonsky, Bobingen/Rems, Germany

[73] Assignee: Zahnradfabrik Friedrichshafen AG, Postfach, Germany

[22] Filed: Sept. 27, 1972

[21] Appl. No.: 292,612

[30] Foreign Application Priority Data
Oct. 7, 1971   Germany............................ 2149955

[52] U.S. Cl.................. 91/374, 91/370, 180/79.2 R
[51] Int. Cl............................................ F15b 9/10
[58] Field of Search ............. 91/370, 371, 372, 373, 91/374, 375, 375 A, 376, 378; 92/113; 180/79.2 R

[56] References Cited
UNITED STATES PATENTS

| | | | |
|---|---|---|---|
| 2,832,317 | 4/1958 | Henry | 92/113 |
| 3,180,233 | 4/1965 | Jablonsky | 91/374 |
| 3,291,002 | 12/1966 | Folkerts | 91/375 A |
| 3,359,866 | 12/1967 | Folkerts | 91/375 A |
| 3,463,261 | 8/1969 | Runkle et al. | 180/79.2 R |
| 3,508,467 | 4/1970 | Folkerts | 180/79.2 R |

Primary Examiner—Irwin C. Cohen
Assistant Examiner—A. M. Zupcic

[57] ABSTRACT

The invention effects a short path readily sealed against leakage for pressure fluid supply to double acting hydraulic booster steering mechanisms of the type utilizing a piston internally threaded for coacting with an externally threaded steering spindle which extends into the piston and which spindle controls valving for selectively pressurizing either end of the cylinder. In installations where pressure accumulators are utilized for feeding the steering system and other devices on the vehicle, e.g., brakes, leakage in the high pressure system is serious because the size of accumulators are limited by space requirements and pumps for pressurizing accumulators are small. Hence, the invention minimizes such leakage by pressure feed through a tube passing into the piston from an end of the cylinder and communicating with a pressure feed bore in the steering spindle. Since the parts are small the sealing elements for such tube are correspondingly small and the leakage thereby reduced to a minimum.

3 Claims, 2 Drawing Figures

AUXILIARY POWER STEERING DEVICE FOR VEHICLES WITH PRESSURE ACCUMULATORS

Incorporated by reference herein is a pending patent application filed by the present inventor, having a common assignee, Ser. No. 266,053, filed June 26, 1972, for Auxiliary Power Steering System. The referenced application shows a booster arrangement of the type utilizing a double acting cylinder and piston coacting with a threaded spindle, and is exemplary only. Thus, the specific valving and complete arrangement of passageways is not essential to the utility of the instant invention which is usable with other valving and passage arrangements. However, the instant invention is explained in conjunction with the particular device disclosed in the referenced application, various details of the disclosure being omitted as not relevant to an understanding of the specific instant invention. Accordingly, although the referenced application may be relied on for fuller understanding of the specific valving and passage arrangement such features are not claimed herein except broadly to the extent sufficient to support claiming a booster steering device of the general type described in combination with the specific instant invention for accumulator type booster systems.

In general, with conventional piping and packing seals, these seals have large diameters and are therefore prone to leakage. Considerable fluid waste is experienced. Where continuous flow occurs, as in pump systems without accumulators this is not serious since the pump is constantly maintaining a circulatory flow in the valving. However, this is not true of accumulator systems, where leakage can reduce the flow effectiveness of an accumulator to a possible insufficiency under some circumstances. Accordingly, by a novel arrangement of pressure feed tubing and small seals, all incorporated within the cylinder and piston, the travel path of the leakage fluid, e.g., oil, is minimized and leakage considerably reduced to a point where it is not critical.

Figure 2:
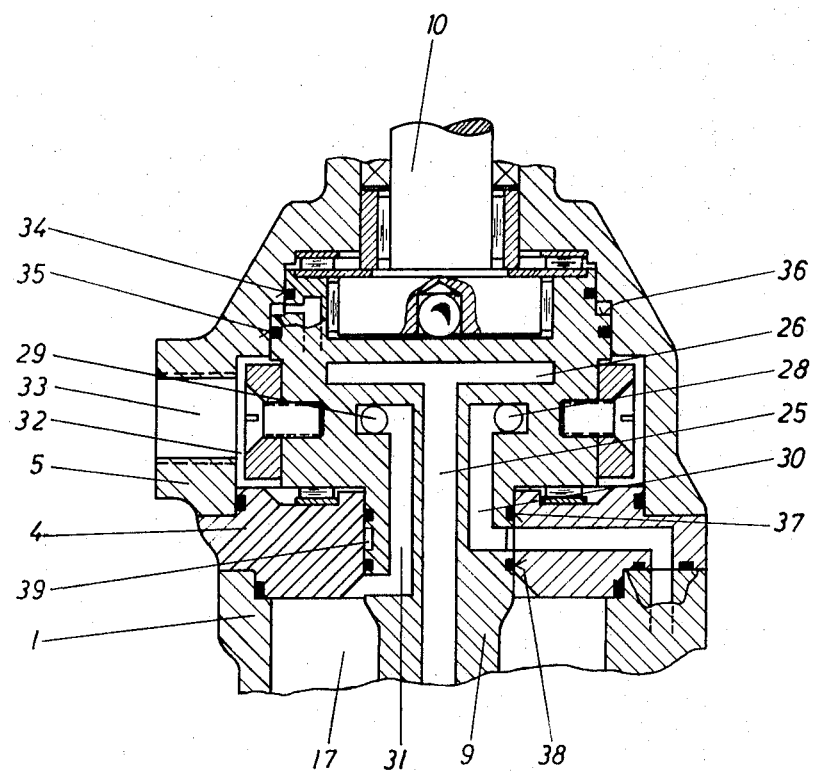

A detailed description of the invention now follows in conjunction with the appended drawing in which:

FIG. 1 is an elevation in section through an assembly of components illustrating the invention, and, FIG. 2 is an enlarged section taken at right angles to the view of FIG. 1.

Referring now to the drawing, the essential components are illustrated comprising a housing 1 for a steering mechanism, in the form of a double acting cylinder having an end wall 2 in which is sealingly secured a closure plug 3. The other end wall of the cylinder is closed by a passage way flange 4 surmounted by a closure housing 5. A hydraulic piston 6 having end faces exposed to respective cylinder pressure chambers 16 and 17 is linearly slidable in the cylinder and is provided with a rack on one side for driving gear sector 7 which will be understood to actuate the steering rods (not shown) of a vehicle.

A steering spindle 9 protrudes into the cylinder through chamber 17 and into a bore of the piston, having threaded coation therewith by means of the usual ball race 8. The steering spindle is operated by a stub shaft 10 which will be understood to connect to a manually operable shaft (not shown) in the steering column of a vehicle. The steering spindle 9 is rotated via the valving means 11 which comprises a valve 12 reversibly actuatable by pin 14 and a road reaction piston arrangement 13 simultaneously actuatable with valve 12 by means of pin 15, all by rotation of stub shaft 10. The valving means is initially actuated, in particular the valve 12, followed by rotation of the steering spindle, as is customary in devices of this kind.

The details of the valving means and various passages therein are very fully disclosed and claimed in the referred application hereinabove identified and there is no need to illustrate or disclose the specific construction herein.

The particular invention herein resides in the provision of the end closure plug 3 having a passage 19 which connects or communicates with an inlet port 18 provided in the end wall of the cylinder. Firmly secured in a face bore of plug 3, is a tube 20 which extends axially into the cylinder through chamber 16 and axially through a bushing 21 threaded into an opening in the end of the piston and locking a further bushing 21' against a shoulder in the piston bore as shown. Bushing 21 has a central bore in which is disposed a sealing collar 22 which affects a radial bearing for tube 20. Collar 22 has an inner groove and an outer groove which carry respective sealing rings 23. The inner ring has slidable sealing engagement with tube 20 and collar 22 is slidably engageable with tube 20 with no play. However, the enlarged flange of collar 22 which carries the outer sealing ring as well as the hubs of collar 22, have a radial clearance with regard to bushing 21 and the bushing 21' so that the piston 6 and the tube 20 have a certain amount of radial play to compensate for any misalignment which might be caused in the moving parts by reason of wear, stress or for any other reason. Should there be such an occurrence of off-setting or misalignment, the clearance between collar 22 and bushing 21 will compensate for same and the resilience and compressability of the outer sealing ring 23 will maintain the seal to prevent or minimize leakage when either of the chambers 16 or 17 is under pressure.

It will be noted that the sealing rings 23 are exceedingly small and therefore the areas through which leakage can occur are correspondingly small. This minimizes by comparison the amount of leakage that would occur with conventional connection and sealing methods and is particularly significant where large leakage cannot be tolerated in accumulator systems.

The tube 20 has a rotative sealed connection by way of sealing ring 24 with an axial passage or bore 25 provided in the steering spindle 9 to conduct fluid pressure to a radial cross passage 26 in flange 4 which connects with a passage 27 provided in the steering spindle 9 for bringing fluid pressure to the valving means. Bores 28 and 29 connect the valve 12 with the road reaction arrangement 13, bore 28 being connected with pressure chamber 16 via a passageway 30 which, as seen in FIG. 2, extends longitudinally in the steering spindle and is in connection with an annular channel 39 which in turn communicates with a bore in the flange 4 connecting with a bore through the wall material of the cylinder for the length of the cylinder to chamber 16. Bore 29 connects with pressure chamber 17 by way of longitudinal passage 31 in the steering spindle as seen in FIG. 2.

Valve 12 connects with an annular chamber 32 in housing cover 5 communicating with exhaust port 33 of the housing cover.

As best seen in FIG. 2, a pressure balancing channel 36 is provided between the upper end of the steering spindle and the housing 5, which channel is connected with pressure chamber 16 to equalize axial forces acting on the steering spindle 9. Various sealing rings are provided such as the sealing rings 34 and 35 which seal the channel 36, and additional seals 37 and 38 which seal the annular groove or channel 39.

Information as to operation of the valving means are not necessary herein and are found in the referred application.

Inasmuch as the pressure balancing chamber 36 and the annular groove 39 are subjected to pressure only from pressure chamber 16 or pressure chamber 17, depending upon which is pressurized, the large diameter of the seals, even though permitting more leakage than small diameter seals would, is not of importance because such leakage occurs only when one or the other of the pressure chambers is pressurized and this is for a very short duration of time. Thus, these channels or chambers 36 and 39 do not connect directly with the supply line from the accumulator and therefore, do not provide a leakage path accept during actual pressurization of one of the pressure chambers.

For completeness of the disclosure insofar as it pertains to the purpose of the specific invention herein, FIG. 1 shows symbolically the exhaust port 33 connecting with a reservoir R, in turn connecting with a pump P, in turn connecting with an oil storage charging valve V through which the accumulator A is pressurized. The accumulator connects to the inlet port 18 and also to various secondary items such as brakes B and oil regulators $V_1$. The connecting arrangement is the same as shown in the referred application.

What is claimed is:

1. In a booster steering system, a source of pressure comprising an accumulator, a double acting cylinder having a pair of pressure chambers and having a steering spindle extending into said cylinder at one end thereof and means whereby said spindle is rotatively sealed at said one end; actuating means for rotating said steering spindle; reciprocal valving means for controlling pressure feed to and exhaust from the chambers of said cylinder and being actuatable by said actuating means; a piston in said cylinder intermediate said chambers and having respective faces in said chambers; said steering spindle having a drive connection with said piston and said piston having means for actuating a steering mechanism; a pressure inlet means at the other end of said cylinder connected to said accumulator and a tube connected to said inlet means and extending into said cylinder and into said piston through one face thereof and into said steering spindle; respective means for sealing said tube in said cylinder, piston and steering spindle; a passageway in said steering spindle connecting with the said tube and extending into connection with said valving means whereby pressure fluid is conducted through said pressure inlet means through said tube and to said valving means.

2. In a booster steering system as set forth in claim 1, including an opening in one face of said piston and the respective sealing means being in said one face and through which said tube passes and comprising a collar having means sealingly encompassing said tube and having radial clearance with said opening and having sealing ring means in said opening by yieldingly compensate for misalignment of said steering spindle and said tube.

3. In a booster steering system as set forth in claim 1, said inlet means comprising a removable plug, means whereby said plug is sealingly and axially secured in the other end of said cylinder and said plug having passage means, said tube being secured thereto connecting with said passage means and means communicating said passage means with said accumulator.

* * * * *